(12) United States Patent
Fry

(10) Patent No.: US 10,497,370 B2
(45) Date of Patent: Dec. 3, 2019

(54) RECOGNITION MODULE AFFINITY

(71) Applicant: 2236008 Ontario Inc., Waterloo (CA)

(72) Inventor: Darrin Kenneth John Fry, Kanata (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 45 days.

(21) Appl. No.: 15/807,004

(22) Filed: Nov. 8, 2017

(65) Prior Publication Data

US 2019/0057690 A1 Feb. 21, 2019

Related U.S. Application Data

(60) Provisional application No. 62/547,461, filed on Aug. 18, 2017.

(51) Int. Cl.
| | |
|---|---|
| *G10L 15/00* | (2013.01) |
| *G10L 15/22* | (2006.01) |
| *G10L 15/32* | (2013.01) |
| *G10L 15/18* | (2013.01) |
| *G10L 15/30* | (2013.01) |

(52) U.S. Cl.
CPC .......... *G10L 15/22* (2013.01); *G10L 15/1815* (2013.01); *G10L 15/30* (2013.01); *G10L 15/32* (2013.01); *G10L 2015/223* (2013.01)

(58) Field of Classification Search
CPC ......... G10L 15/22; G10L 15/32; G10L 15/30; G10L 15/1815; G10L 15/1822; G10L 15/197; G10L 17/26; G10L 15/18; G10L 15/285; G10L 15/02; G10L 15/063; G10L 15/08; G10L 15/26; G10L 15/265; G10L 17/10; G10L 17/02; G10L 15/183; G10L 25/19; G10L 15/193; G10L 15/24; G10L 25/39; G06F 17/289; G06F 17/279; G06F 17/2785; G06F 17/273; G06F 17/2795; G06N 3/006
USPC ....... 704/231, 235, 236, 244, 249, 254, 255, 704/257, 270, 270.1, 275, 8, 9, 10
See application file for complete search history.

(56) References Cited

U.S. PATENT DOCUMENTS

| | | | |
|---|---|---|---|
| 8,670,979 B2 | 3/2014 | Gruber et al. | |
| 9,117,453 B2* | 8/2015 | Bielby | G10L 15/32 |
| 9,263,039 B2* | 2/2016 | Di Cristo | G06F 17/279 |
| 9,292,952 B2* | 3/2016 | Giuli | B60W 50/10 |
| 9,626,959 B2* | 4/2017 | Di Cristo | G06F 17/273 |
| 9,721,570 B1 | 8/2017 | Beal et al. | |
| 10,049,668 B2* | 8/2018 | Huang | G10L 15/285 |

(Continued)

OTHER PUBLICATIONS

EPO, Extended European Search Report, relating to EP application No. 18186493.5, dated Dec. 19, 2018.

(Continued)

*Primary Examiner* — Vijay B Chawan
(74) *Attorney, Agent, or Firm* — Rowand LLP

(57) ABSTRACT

A system and method to receive a spoken utterance and convert the spoken utterance into a recognized speech results through multiple automatic speech recognition modules. Multiple conversation modules interpret the recognized speech results. The system and method assign an affinity status to one or more of the multiple automatic speech recognition modules. An affinity status restricts the conversion of a subsequent spoken utterance to a selected automatic speech recognition module or modules.

20 Claims, 5 Drawing Sheets

(56) References Cited

U.S. PATENT DOCUMENTS

| | | | |
|---|---|---|---|
| 10,108,608 B2* | 10/2018 | Williams | G06F 17/289 |
| 2005/0240404 A1* | 10/2005 | Gurram | G10L 15/32 |
| | | | 704/231 |
| 2006/0184357 A1 | 8/2006 | Ramsey et al. | |
| 2009/0055824 A1* | 2/2009 | Rychtyckyj | B60W 50/10 |
| | | | 718/101 |
| 2009/0064155 A1* | 3/2009 | Giuli | B60W 50/10 |
| | | | 718/103 |
| 2011/0161077 A1* | 6/2011 | Bielby | G10L 15/32 |
| | | | 704/231 |
| 2012/0245934 A1* | 9/2012 | Talwar | G10L 15/22 |
| | | | 704/235 |
| 2012/0253823 A1* | 10/2012 | Schalk | G01C 21/3608 |
| | | | 704/270.1 |
| 2013/0253929 A1* | 9/2013 | Weider | G10L 15/22 |
| | | | 704/235 |
| 2014/0067392 A1* | 3/2014 | Burke | G10L 15/22 |
| | | | 704/236 |
| 2014/0288932 A1* | 9/2014 | Yeracaris | G10L 15/30 |
| | | | 704/249 |
| 2014/0313208 A1* | 10/2014 | Filev | B60W 50/10 |
| | | | 345/474 |
| 2014/0365209 A1* | 12/2014 | Evermann | G06F 17/279 |
| | | | 704/9 |
| 2014/0365222 A1* | 12/2014 | Weider | G10L 15/22 |
| | | | 704/257 |
| 2015/0340033 A1* | 11/2015 | Di Fabbrizio | G10L 15/18 |
| | | | 704/254 |
| 2015/0363393 A1* | 12/2015 | Williams | G06F 17/289 |
| | | | 704/8 |
| 2016/0027440 A1* | 1/2016 | Gelfenbeyn | G10L 15/32 |
| | | | 704/244 |
| 2016/0151917 A1* | 6/2016 | Faridi | B25J 9/0003 |
| | | | 700/253 |
| 2017/0018271 A1* | 1/2017 | Khan | G10L 15/14 |
| 2017/0083285 A1 | 3/2017 | Meyers et al. | |
| 2018/0108357 A1 | 4/2018 | Liu | |
| 2018/0137857 A1 | 5/2018 | Zhou et al. | |
| 2018/0232436 A1 | 8/2018 | Elson et al. | |
| 2018/0358005 A1* | 12/2018 | Tomar | G06F 17/2785 |

OTHER PUBLICATIONS

USPTO, Office Action relating to U.S. Appl. No. 15/862,224 dated May 16, 2019.

USPTO, Office Action relating to U.S. Appl. No. 15/940,333, dated Aug. 8, 2019.

* cited by examiner

RECOGNITION MODULE AFFINITY

PRIORITY CLAIM

This application claims priority to U.S. Provisional Patent Application No. 62/547,461, filed Aug. 18, 2017, titled "Recognition Module Affinity," which is herein incorporated by reference.

BACKGROUND OF THE DISCLOSURE

Technical Field

This disclosure relates to a speech recognition architecture and specifically to an automatic speech recognition architecture that supports multiple speech recognition systems.

Related Art

Automatic speech recognitions (ASR) systems allow users to interface electronic systems with their voices. Many systems convert speech to text, but are limited to specific subject matter domains. For example, some ASRs are well suited for making reservations, such as the reservations for hotel rooms. Other ASR systems are well suited for home automation. Unfortunately, the failure to connect to a wide range of subject matter domains via a single system often leads to "recognition errors" and causes break downs in communication.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

ASR systems and processes (referred to as an ASR system) provide speech recognition services from end-to-end. The ASR systems support one or more recognition modules that convert speech-to-text (STT) or an utterance-to-text. The ASR systems may provide services to other components through interfaces that hide the existence of remote or third party recognition software. That software may be replaced without affecting the rest of the ASR system. The ASR systems perform extensible speech recognition functions through modules. The modules have two parts: an interface that enables interaction with other modules and/or entities and software that executes various ASR functions. The modules interact with an input-output ASR controller that manages the ASR conversations, invokes various modules, and assigns an affinity status to one or more speech recognition services in response to a prior speech recognition result, a designation within a configuration file, and/or upon a user's request. An affinity is a preference that causes the input-output ASR controller to route future utterances to a specific recognition module or a set of recognition modules.

Figure 1:
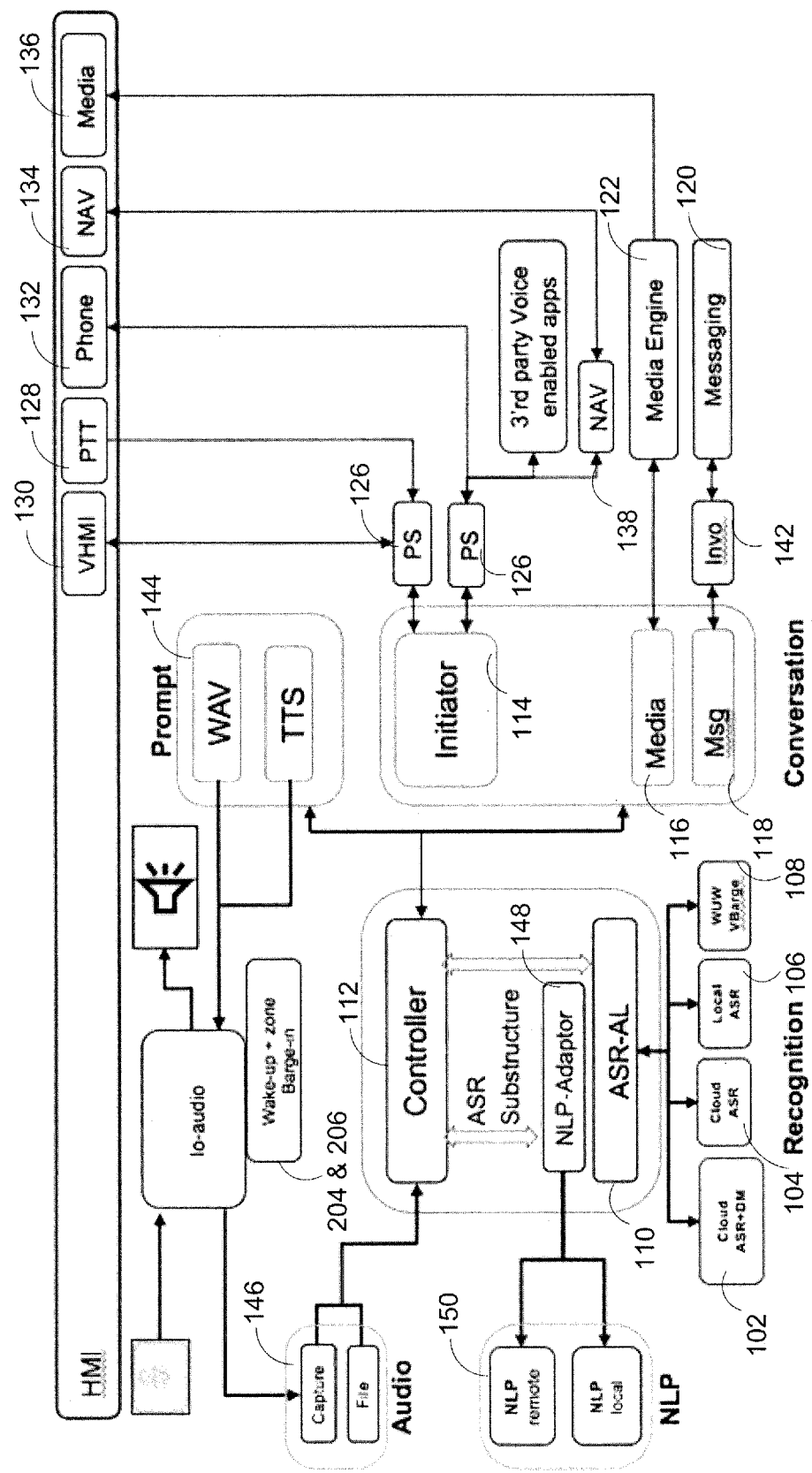
FIG. 1 is a block diagram of an ASR system.

In FIG. 1, recognition modules 102-108 interface an ASR abstraction layer 110. The recognition modules 102-108 include on-demand and local recognition modules. The on-demand recognition modules 102 and 104 provide shared computer-processing resources through the cloud (e.g., an internet-based computing). The local recognition module 106 and 108 provide local recognition services to the input-output ASR controller 112.

In FIG. 1, the conversation modules 114-122 are domain experts decoupled from speech recognition providers so that the conversation modules 114-122 work with multiple recognition modules. The conversation modules 114-122 process the interpreted speech provided by a recognition service via the recognition modules 102-108 or interpreted speech provided by the natural language processor 150 in lieu of the interpretation provided by the recognition service to execute various functions. While multiple conversation modules are shown in FIG. 1, alternate systems include more conversation modules. The conversation modules handle specific types of recognized results and assign a rating or a score that allows the input-output ASR controller 112 to determine which recognition module or set of recognition modules should handle the next turn (e.g., convert the next spoken utterance to text) if an affinity status is not previously designated. In FIG. 1, the domain experts include an initiator module 114 that transmits and subscribes to objects through publish-and-subscribe services. The publish-and-subscribe module 126 interfaces push-to-talk logic 128 and voice Human Machine Interface (HMI) logic 130. The publish-and-subscribe module 126 also interfaces a phone module 132 and one or more external domain experts such as the navigation module 134 accessed through a navigation interface 138. Media logic 136 interfaces a media engine 140 and the messaging conversation module 118 interfaces messaging logic 120 through an invocation framework 142. In some systems, conversation modules designated by the input-output ASR controller 112 maintain state. A speech session may comprise the time in which only the designated conversation modules process the recognized speech results. Alternatively, a session may be the time in which it takes the ASR system to determine and complete a task.

The input-output ASR controller 112 may be triggered by a recognition module that monitors audio for a wakeup phrase, an initiator module 114 that handles requests to initiate a speech session, or an actuation of a user interface button that causes an update to a publish-and-subscribe (PS) object. The system may prompt the user for a command or an utterance. A way prompt module 144 may play tones or pre-recorded voice via .wav files, and a TTS prompt module may be used to synthesize voice for prompts provided in textual form via prompt module 144. The prompt module 144 may be used by service providers and other modules (e.g., conversation modules 114-122, recognition modules 102-108) to render appropriate prompts).

When a speech session is initiated via a PS update or wakeup phrase detection, the input-output ASR controller 112 notifies the audio capture module 146 that it should begin capturing the user's spoken utterance. The input-output ASR controller 112 then passes control to each of the recognition modules 102-108 through the ASR abstraction layer 100. Each of the recognition modules 102-108 converts the utterance to a text string and assigns the recognition result a confidence level to indicate how well the utterance was understood by the recognizer. If the confidence level through all the recognition results does not exceed a threshold, the input-output ASR controller 112 will generate an error result and provide the error result to the conversation modules 114-122 that may seek to repeat the utterance or seek information related to it.

When successful results are available, they are provided to the ASR abstraction layer 110. When the recognition results do not have a natural language payload or have a natural language payload that may be enhanced, the recognition results are pushed to the natural language processor adapter 148 that may access a local or a remote natural language processor 150. The natural language processor 150 may return a natural language component, which may designate an interpreted aim or purpose of an utterance known as an intent (e.g., an intent may be play a media selection or dial a phone number) and/or provide data. The data may be related to a recognition result (e.g., the weather forecast for Chicago, Ill. if the recognized result is requesting a forecast for Chicago). The intent for a given speech result is added to that speech result. (e.g., a 'result' contains both the ASR transcription, probabilities, etc., that come from transforming audio signals to text, but also contains the interpretation of that text complete with classification of intent and any extracted or generated data fields).

The input-output ASR controller 112 then passes all of successful results of the recognition modules to all of the conversation modules 114-122 to process the recognized speech and determine which conversation module takes over to process the recognized speech or complete the command making it the exclusive conversation module. The conversation modules 114-122 first determine the context of the utterance (e.g., search, multimedia, or phone) is relevant to its domain, which then determines which conversation module takes preference or precedence over the other conversation modules and completes the action or command associated with the utterance. The determined context of each recognized result, fitness of each recognized result (as determined by any suitable fitness metric), and/or etc., are also used by each conversation module to assign a rating or a score that allows the input-output ASR controller 112 to determine which recognition module or modules should handle the next turn (e.g., convert the next spoken utterance to text). At this point, the context and ratings/scores are returned to the input-output ASR controller 112 from each conversation module rendering a context, which the input-output ASR controller 112 processes to determine which recognition module is to be assigned an affinity status. At this point, the exclusive conversation module either completes the action or triggers another speech recognition turn, which prompts the user for more information that is processed with the recognition module or modules assigned an affinity status. This process continues until an action is executed or completed. The input-output ASR controller 112 then removes the affinity status assigned to the designated recognition module when state changes or a speech session ends so that a fresh speech recognition turn can begin.

In FIG. 1, recognition module affinity status and conversation module exclusivity status is maintained and recorded by the input-output ASR controller 112. The input-output ASR controller 112 records, which speech recognitions were selected by the conversation module and where the selected speech recognitions came from. The input-output ASR controller also monitors when a speech recognition session begins and ends. Affinity status can persist through multiple speech sessions or can be dropped at the end of a speech session. As such, the ASR system reduces the amount of data the ASR system processes (as not all recognition modules process subsequent speech recognition turns) and it improves system efficiency by reducing processor loads. The ASR system also improves speech recognition consistency as it uses the same resources to process spoken utterances within a speech recognition session. Further, the system reduces ASR system bandwidth by not processing data with recognition modules that do not have an affinity status and/or by not processing recognized speech with conversation modules that do not have exclusive status in subsequent speech recognition turns.

Figure 2:
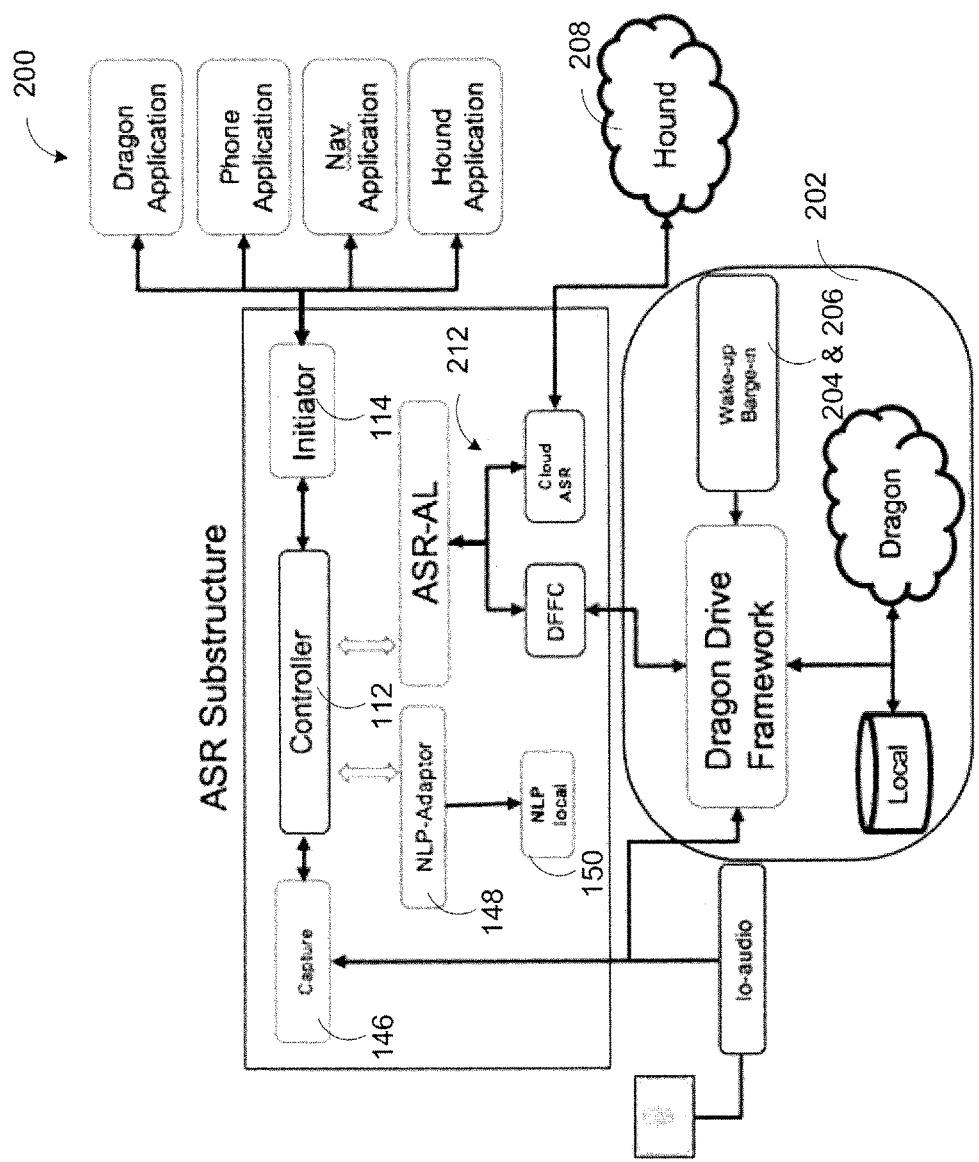
FIG. 2 is a client-server framework for interfacing local and remote speech recognition modules through an ASR substructure.

FIG. 2 is a client-server framework for interfacing local and remote recognition modules or services through an ASR substructure. The client-server framework interfaces cloud-based recognizers shown as Dragon Drive 202 that executes a natural language processing (NLP) that supports private actions (e.g., book a restaurant reservation, etc.). Dragon Drive supports a wake-up service module 204 that allow users to initiate voice recognition by speaking predefined phrases. It also supports a barge-in service module 206 that allows the ASR system to listen to a user's speech while ignoring any sounds that originate from the ASR's prior speech recognition event as speech is rendered through a phone or a vehicle cabin, for example.

The client-server framework of FIG. 2 may include two, three, or more remote recognition services, including the two shown: Dragon Drive 202 and Hound 208. The recognition services may support mutually exclusive subject matter domains and/or overlapping subject matter domains or topics. In FIG. 2, the speech recognition results are prompted to the ASR abstraction layer 110 through service framework interfaces 212. The input-output ASR controller 112, which determines which recognition service will process the next utterance, processes the context returned by the remote recognition services or module. At this point, the exclusive conversation service selected either completes the action or triggers another recognition turn, which prompts the user for more information. Responses to the prompt or the result may be passed to the initiator module 114, which transmits the results to the exemplary external application modules 200 shown in FIG. 2.

When the recognition results from the remote recognition services do not have a natural language payload or a natural language payload from the recognition service that can be enhanced, the recognition results are pushed to the natural language processor adapter 148 that may access local natural language resources 150. The natural language processor adapter 148 may return a natural language component, which may designate an interpreted aim or purpose for an utterance and/or provide related content or data (e.g., an intent).

In FIG. 2, the recognition services interact with the input-output ASR controller 112 that manages the ASR conversations and assigns an affinity status to one or more of the speech recognitions services. The affinity status may be assigned in response to a prior speech recognition result, a designation within a configuration file associated with one or more of the remote recognition services, and/or may be assigned in response to a user's command. By this assignment, for example, one wake up phrase may establish an affinity for one speech recognition service, and a different wakeup phrase may establish an affinity to a separate and in some instances remote speech recognition service from the first speech recognition service. By these assignments, an audio phrase such as "Alexa open my garage door" may be sent to only to an Alexa Voice Service Module (AVSM), while the audio phrase "Cortana check my work schedule" may be sent only to the Cortana Voice Service module that is separate and remote from the AVSM. Once established by a wake up phrase, the affinity status is maintained throughout speech session that was initiated. The user command may occur by a manual user actuation (via a virtual or physical button) or in response to a user's verbal command. When not modified by a user's commands, a configuration file affinity may be pre-designated, read, and applied when the ASR system begins operation. In FIG. 2, the affinity designation causes the input-output ASR controller 112 to route future utterances to a specific recognition service or set of specific recognition services.

Figure 3:
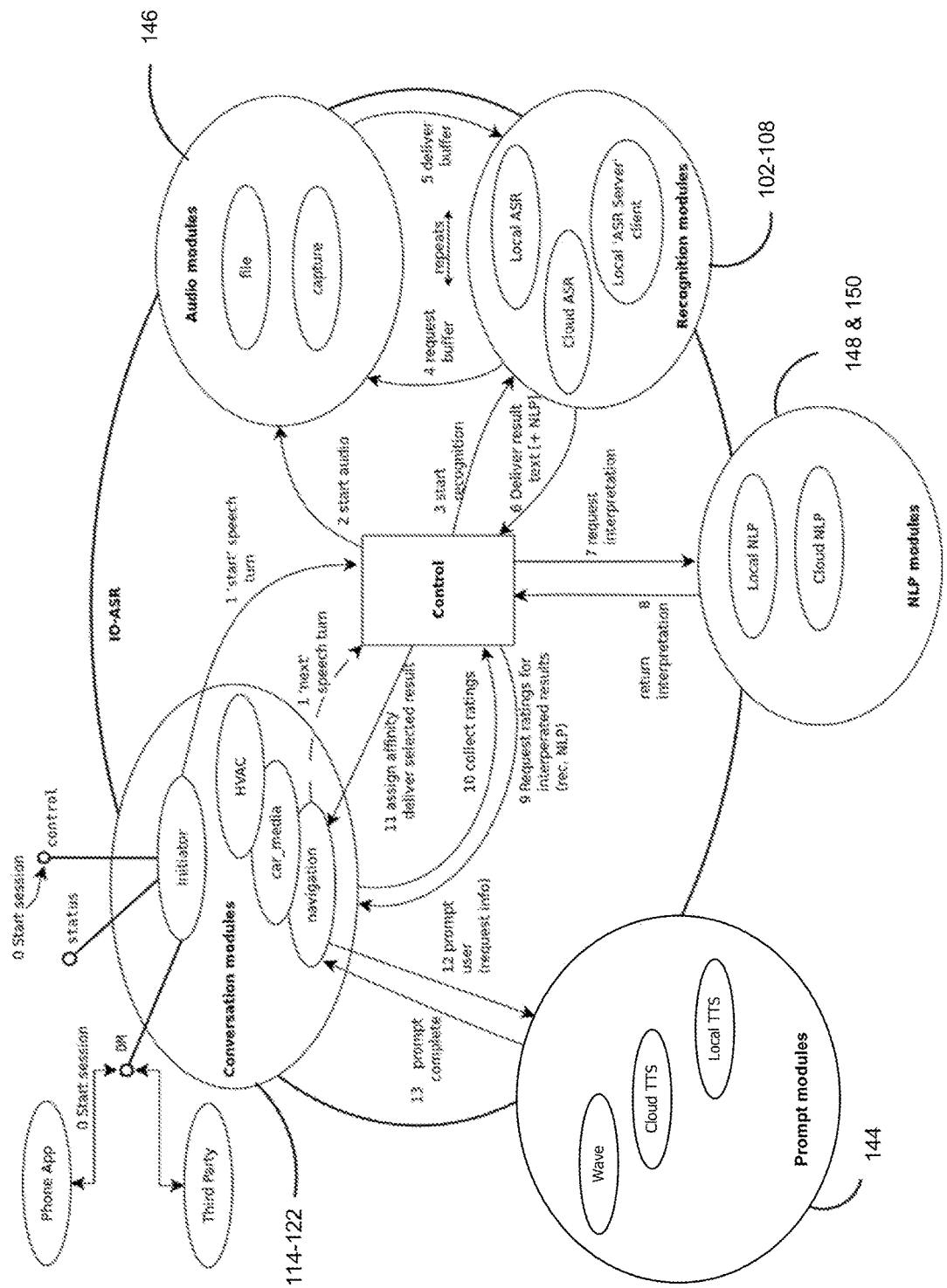
FIG. 3 is an ASR service flow.

FIG. 3 is an ASR service flow that operates on a revolving basis, performing the same sequence of operations as often and as required to interpret the recognized speech and execute the appropriate action. In FIG. 3, a prompt triggered by the conversation modules 114-122 (that includes the initiator 114) initiates the ASR flow at 1. The initiator 114 monitors a control line, a phone application, or third party system for ASR events and then starts a speech recognition turn by sending a turn request to the ASR controller 112.

The ASR system notifies the audio capture module 146 at 2, which then begins to capture the user's spoken utterance. The input-output ASR controller 112 passes control to the local and cloud recognition modules 102-108 at 3. If the user's spoken utterance is not captured, the recognition modules 102-108 may return an error result to be processed. If no recognition modules 102-108 return a result, the input-output ASR controller generates an error result for the conversation modules 114-122 to process.

On a successful capture, each of the recognition modules 102-108 converts the utterance to a text string via repeated exchanges at 4 and 5 and assigns the recognition result a level of confidence to indicate how well the utterance was understood by the recognizer modules 102-108 before it is returned to the input-output ASR controller 112 at 6. If the confidence level through all the recognition results does not exceed a threshold level, the input-output ASR controller 112 generates an error result for the conversation modules 114-122 to process 11. The conversation module that handles the error result may ask that the utterance be repeated or seek information related to it.

When the recognition results do not have a natural language payload or have a natural language payload that may be enhanced, the recognition results are pushed to the natural language processor adapter 148 that may access a local or a remote natural language processor 150 at 7. The natural language processor 150 may return a natural language component at 8, which may designate an interpreted aim or purpose of an utterance known as an intent (e.g., an intent may be play a media selection or dial a phone number) and/or provide data. The data may be related to a recognition result (e.g., the weather forecast for Chicago, Ill. if the recognized result is requesting a forecast for Chicago).

The input-output ASR controller 112 then passes all of the successful results of the recognition modules to all of the conversation modules 114-122 (e.g., car_media, HVAC, navigation in FIG. 3) at 9 to execute various actions in response to the recognized speech. The conversation modules 114-122 first determine the context of the utterance (e.g., search, multimedia, or phone). The context of each recognized result, fitness of each recognized result, and/or etc. are used by each conversation module to assign a rating or a score that allows the input-output ASR controller 112 to determine which recognition module or modules should handle the next turn (e.g., convert the next spoken utterance to text) at 11. Prior to this point, in response to a request for ratings from the input-output ASR controller 112 at 9, the context and ratings/scores are returned to the input-output ASR controller 112 from each conversation module rendering a context at 10. The ratings/scores are processed by the input-output ASR controller 112 to determine which recognition module is assigned an affinity status. It is further processed by the conversation modules 114-122 to determine which conversation module takes over to process the utterance or complete the command (e.g., the exclusive conversation module). At this point, the exclusive conversation module either completes the action or triggers another speech recognition, which prompts the user for more information at 12 and 13. This process continues until an action is executed, a command is fulfilled, or a task is completed. The input-output ASR controller 112 then removes the affinity status assigned to the designated recognition module when a speech session ends or state changes so that a fresh speech recognition turn can proceed.

Figure 4:
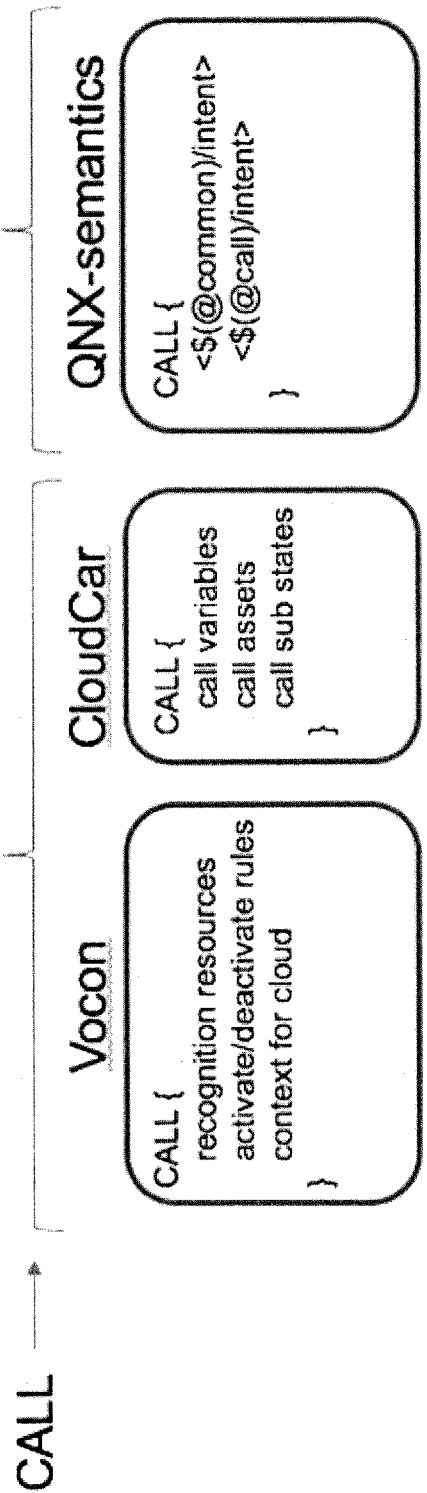
FIG. 4 is a block diagram of ASR modules.

FIG. 4 is a block diagram of the ASR modules and call functions that may coordinate ASR activities from multiple recognition modules or services. The ASR system can be modified to extend or add conversation modules and recognition modules. With its knowledge of the framework and semantics of different recognition services such as Vocon, CloudCar, QNX, and others for example, the ASR system can set up context for each resource, comply with rules, call variables, assets, and sub-states, access intents, etc., through configuration files associated with the conversation modules and/or recognition modules. These modules interact with the input-output ASR controller that manages the ASR conversations, invokes the various ASR modules, and assigns an affinity status to one or more speech recognitions services in response to a prior speech recognition result, a designation within the configuration file, and/or in response to a user's request.

Figure 5:
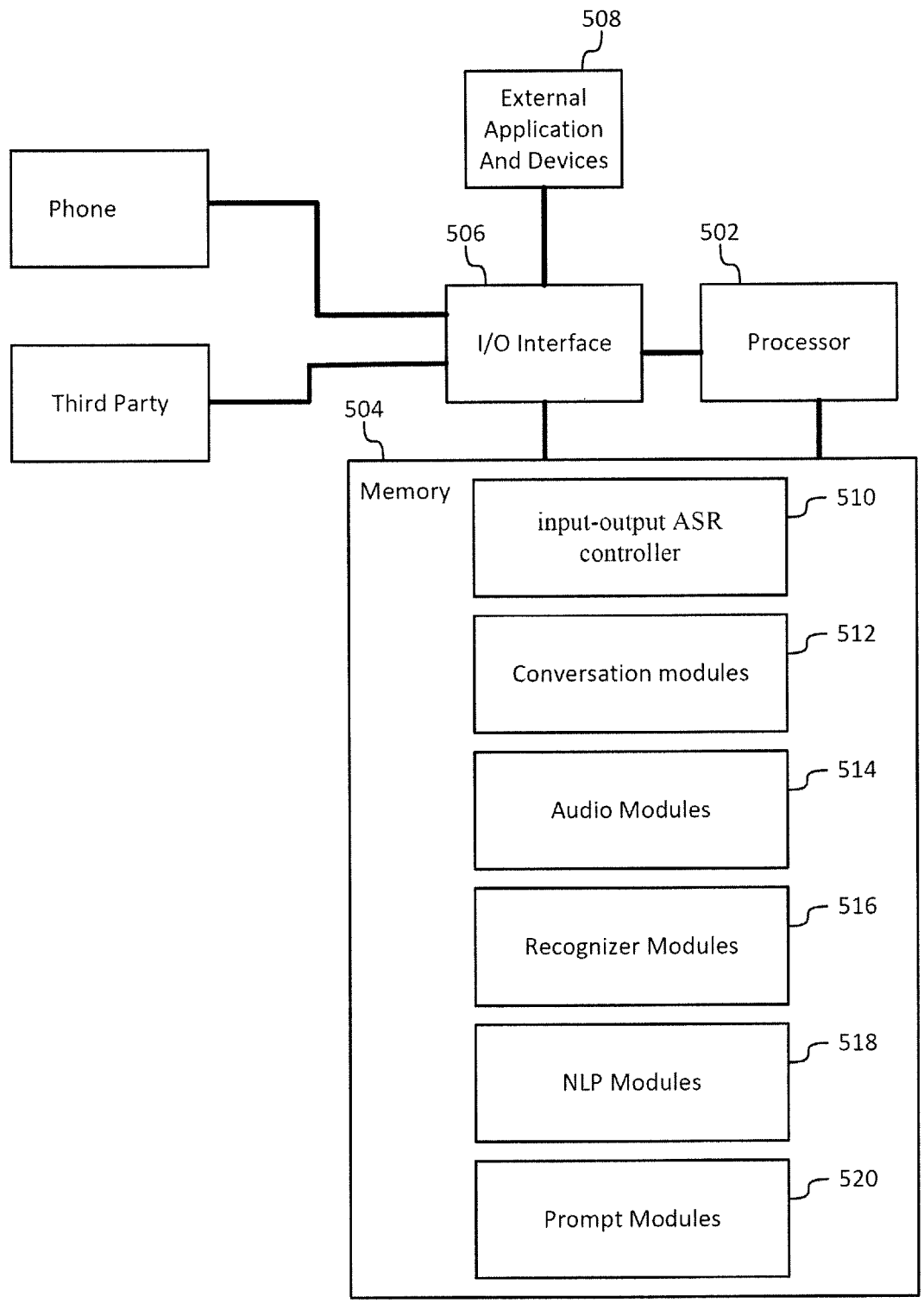
FIG. 5 is an alternate block diagram of an ASR system.

FIG. 5 is a block diagram of a vehicle that provides voice control services for search, media, voice dialing, etc. The system comprises a processor 502, a non-transitory media such as a memory 504 (the contents of which are accessible by the processor 502) and an I/O interface 506. The I/O interface 506 connects devices and local and/or remote applications such as, for example, modified or additional local and/or remote recognition modules and local and/or remote conversation modules. The memory 504 may store instructions which when executed by the processor 502 causes the system to render some or all of the functionality associated with converting STT, converting TTS, interpreting the recognized speech, and executing an appropriate action. For example, the memory 504 may store instructions which when executed by the processor 502 causes the system to render the functionality associated with input-output ASR controller 510, the conversation modules 512, the audio modules 514, the recognizer modules 516, the NLP modules 518, and the prompt modules 520.

The processors 502 may comprise a single processor or multiple processors that may be disposed on a single chip, on multiple devices, or distributed over more than one system. The processors 502 may be hardware that executes computer executable instructions or computer code embodied in the memory 504 or in other memory to perform one or more features of the systems described herein. The processor 502 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 504 may comprise a single device or multiple devices that may be disposed on one or more dedicated memory devices or disposed on a processor or other similar device. When functions or steps are said to be "responsive to" or occur "in response to" a function or a process, the device functions or steps necessarily occur as a result of the function or message. It is not sufficient that a function or act merely follow or occur subsequent to another.

The memory 504 may also store a non-transitory computer code, executable by processor 502. The computer code may be written in any computer language, such as C, C++, assembly language, channel program code, and/or any combination of computer languages. The memory 504 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The ASR systems offer speech recognition services that support local and remote SST and TTS. The ASR system uses application-specific conversation modules to provide speech or prompting handling throughout the system. The conversation modules are decoupled from the speech-recognition providers so the modules will work with multiple ASR providers. The system allows functionality to be added or removed through modules. The modules may be used within telephone systems and vehicles and may interface infotainment processor and digital signal processors or DSPs and co-exist and communicate with other system software. A vehicle may include without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. An automatic speech recognition system, comprising:
a processor configured to:
receive a spoken utterance;
convert, using the processor, the spoken utterance into a plurality of recognized speech results through a plurality of automatic speech recognition modules;
interpret, using the processor, each of the plurality of recognized speech results rendered by each of the plurality of automatic speech recognition modules through a plurality of natural language processing modules;
process, using the processor, each of the plurality of recognized speech results through a plurality of conversation modules;
assign, using the processor based on a plurality of rating values generated by the plurality of conversation modules and indicating a fitness of the recognized speech results, an affinity status to one or more automatic speech recognition modules of the plurality of automatic speech recognition modules to restrict a conversion of a subsequent spoken utterance to the one or more automatic speech recognition modules assigned the affinity status.

2. The system of claim 1, wherein the processor assigns the affinity status in response to the plurality of recognized speech results.

3. The system of claim 1, wherein the processor assigns the affinity status prior to the conversion of the spoken utterance into a plurality of recognized speech results.

4. The system of claim 2, wherein the processor assigns the affinity status from a configuration file.

5. The system of claim 1, wherein the processor assigns the affinity status in response to a user request.

6. The system of claim 1, wherein the plurality of automatic speech recognition modules are remote from the plurality of conversation modules.

7. The system of claim 1, wherein the automatic speech recognition system comprises a vehicle.

8. A computer-implemented method comprising:
receiving, using a processor, a spoken utterance;
converting, using the processor, the spoken utterance into a plurality of recognized speech results through a plurality of automatic speech recognition modules;
interpreting, using the processor, each of the plurality of recognized speech results rendered by each of the plurality of automatic speech recognition modules through a plurality of natural language processing modules;
processing, using the processor, each of the plurality of recognized speech results through a plurality of conversation modules; and
assigning, using the processor, based on a plurality of rating values generated by the plurality of conversation modules and indicating a fitness of the recognized speech results, an affinity status to one or more automatic speech recognition modules of the plurality of automatic speech recognition modules to restrict a conversion of a subsequent spoken utterance to the one or more automatic speech recognition modules assigned the affinity status.

9. The method of claim 8, wherein the affinity status is assigned in response to the plurality of recognized speech results.

10. The method of claim 8, wherein the affinity status is assigned prior the conversion of the spoken utterance into a plurality of recognized speech results.

11. The method of claim 10, wherein the affinity status is rendered from a configuration file loaded when ASR begins operation.

12. The method of claim 8, wherein the affinity status is assigned in response to a user's verbal request.

13. The method of claim 8, wherein the plurality of automatic speech recognition modules are remote from the plurality of conversation modules.

14. The method of claim 8, wherein the method is executed by a vehicle.

15. A non-transitory machine-readable medium encoded with machine-executable instructions, wherein execution of the machine-executable instructions by a processor is for:
   receiving, using the processor, a spoken utterance;
   converting, using the processor, the spoken utterance into a plurality of recognized speech results through a plurality of automatic speech recognition modules;
   interpreting, using the processor, each of the plurality of recognized speech results rendered by each of the plurality of automatic speech recognition modules through a plurality of natural language processing modules;
   processing, using the processor, each of the plurality of recognized speech results through a plurality of conversation modules; and
   assigning, using the processor, based on a plurality of rating values generated by the plurality of conversation modules and indicating a fitness of the recognized speech results, an affinity status to one or more automatic speech recognition modules of the plurality of automatic speech recognition modules to restrict a conversion of a subsequent spoken utterance to the one or more automatic speech recognition modules assigned the affinity status.

16. The non-transitory machine-readable medium of claim 15, wherein the affinity status is assigned in response to the plurality of recognized speech results.

17. The non-transitory machine-readable medium of claim 15, wherein the affinity status is assigned prior to the conversion of the spoken utterance into a plurality of recognized speech results.

18. The non-transitory machine-readable medium of claim 15, wherein the affinity status is rendered from a configuration file.

19. The non-transitory machine-readable medium of claim 15, wherein the affinity status is assigned in response to a user's verbal request.

20. The non-transitory machine-readable medium of claim 15, wherein the plurality of automatic speech recognition modules are remote from the plurality of conversation modules.

\* \* \* \* \*